United States Patent Office 3,738,844
Patented June 12, 1973

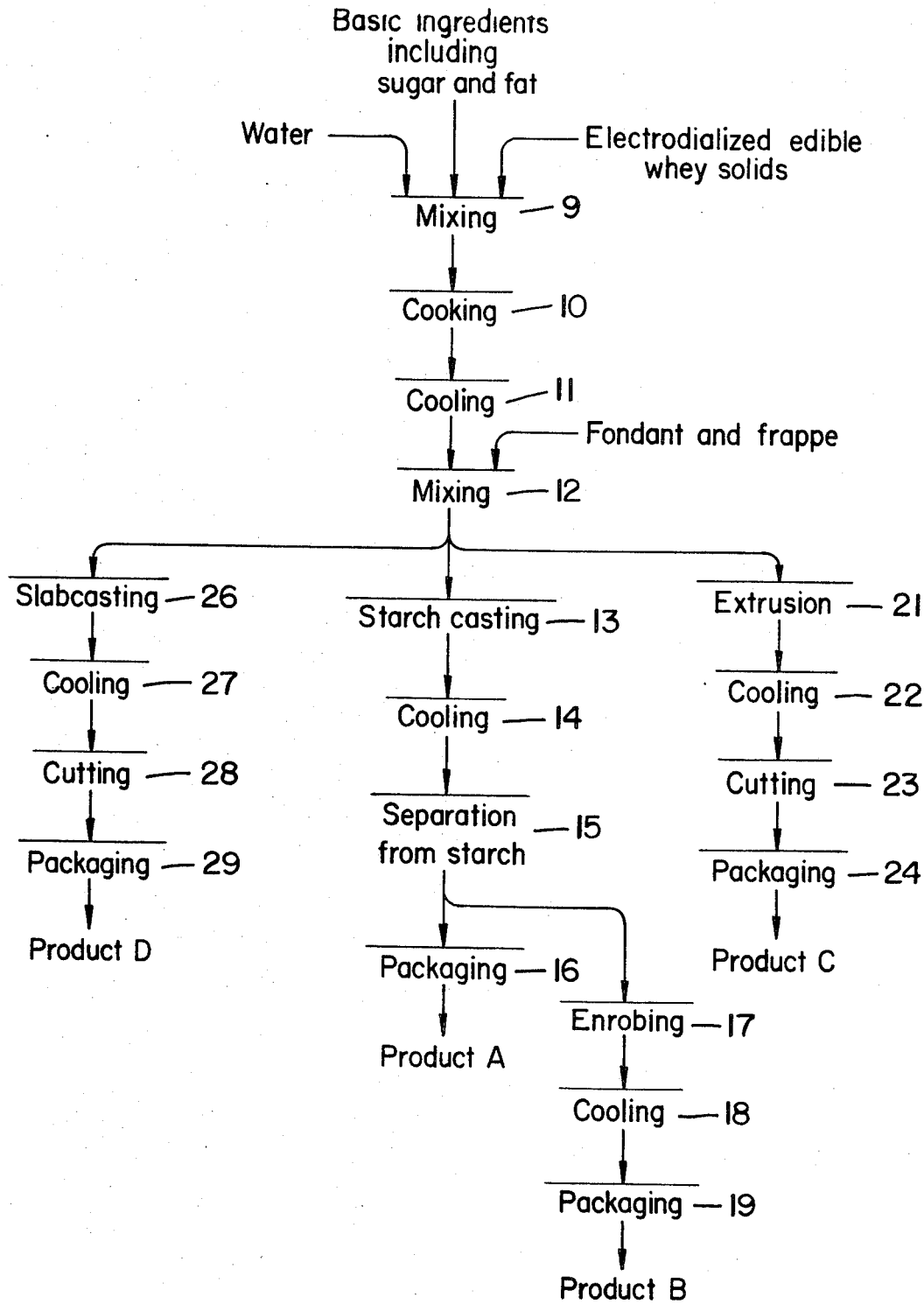

3,738,844
CONFECTIONS CONTAINING LOW-ASH
DEMINERALIZED WHEY SOLIDS
Kenneth E. Rash, Jr., Pleasanton, John C. Colmey,
Diablo, and Charles E. Zanzig, Danville, Calif., assignors to Foremost-McKesson, Inc., San Francisco,
Calif.
Continuation-in-part of abandoned application Ser. No.
807,280, Mar. 14, 1969. This application June 10, 1971,
Ser. No. 151,685
Int. Cl. A23g 3/00
U.S. Cl. 99—134 R    6 Claims

ABSTRACT OF THE DISCLOSURE

Confection mixes and products having all or part of the milk solids replaced with low ash content-electrodialyzed whey solids.

CROSS REFERENCE TO RELATED APPLICATION

This application is a continuation-in-part of copending application Ser. No. 807,280, filed Mar. 14, 1969 now abandoned for "Confection and Method of Manufacture."

BACKGROUND OF THE INVENTION

Various formulas for the manufacture of confections or candies have included milk solids in the form of liquid, condensed or powdered nonfat milk (i.e., skim milk), whole milk or cream to provide improved food value, texture and flavor. Because of the cost of such forms of milk solids, which presently is increasing, it has been proposed to substitute less expensive edible grades of whey, such as are now available on the market. Aside from the reduced protein content afforded by whey as compared to skim milk, whole milk or cream, it has been found that such substitution material impairs the quality of the confection, having reference particularly to flavor, texture and color. Thus, whey has not been used to any extent in confections or candies of the fudge type, and to only at very low levels in candies of the caramel type which is not have a crystalline or grained texture.

SUMMARY OF THE INVENTION AND OBJECTS

This invention relates generally to confections or candies and particularly to such products having a substantial content of whey solids. It also pertains to methods for the manufacture of such confections.

In general, it is an object of the invention to provide a confection or candy mix with includes edible whey solids and which can be used to produce various high quality confections or candies. For the fudge or grained type of confection the mix is characterized by the fact that cooking involves higher temperatures compared to conventional mixes, with greater fluidity at the end of the cooking step.

Another object is to provide a high quality confection or candy produced by use of our mix, characterized by the fact that the whey solids content is of the electrodialyzed type, having a low ash content compared to conventional edible whey.

Another object is to provide a confection mix and product which as a protein content that is effectively increased by use of electrodialyzed and partially delactosed whey.

Another object of the invention is to provide a novel method for the manufacture of fudge type confections or candies which makes possible a high cooking temperature and a relatively high fluidity after cooking. The method makes use of electrodialyzed whey solids which are employed to take the place of all or a substantial part of conventional milk solids.

Additional objects and features of the invention will appear from the following description in which the preferred embodiments have been set forth in detail in conjunction with the accompanying drawing.

BRIEF DESCRIPTION OF THE DRAWING

The single figure of the drawing is a flow diagram illustrating steps for carrying out the present invention.

DESCRIPTION OF THE PREFERRED EMBODIMENTS

The present invention involves the use of whey which has been subjected to electrodialysis to reduce its ash content. Commercial edible whey such as is produced in the production of cheddar cheese has an ash content of the order of 8.5 to 9.0% (dry solids basis). It is known that by methods of electrodialysis the mineral salt content of such whey can be substantially reduced, with a corresponding reduction in ash content. Also the invention pertains to use of electrodialyzed whey from which a substantial protion of the original lactose content has been removed.

Edible whey suitable for use in the present invention can be produced by use of electrodialysis equipment consisting of a plurality of membrane stacks connected in series, with the whey flowing through ducts concurrently to a brine stream. Suitable equipment of this type is manufactured by Ionics, Inc. (see Pats. 2,730,786; 2,731,411 and 2,800,445). Also use can be made of the electrodialysis method and equipment disclosed in Pat. 3,544,436. Preparatory to electrodialyzing, it is desired to concentrate the whey by evaporation to produce a concentrate ranging from 20 to 26% solids, after which the pH can be adjusted toward neutrality, as for example to from pH 6.0 to 6.5. It is also desirable (see Pat. 3,447,930) to subject the concentrate to clarification as by heating to a temperature of the order of 150° F. for a period of about 5–10 minutes, after which the concentrate is subjected to centrifuging for the purpose of removing any coagulated solid fragments or curd.

To produce the desired demineralize whey, electrodialysis is applied to effect removal of from about 25 to 90% or more of the mineral salt content. Assuming that the ash content before being electrodialyzed is of the order of from 8.5 to 9.0%, then the electrodialyzed whey may have an ash content of the order of from 6.5 to 0.9%.

In general, use of a low or medium heat whey without further denaturation during processing has been found to produce an electrodialyzed product suitable for use in the present invention, although high heat wheys are likewise deemed to be applicable.

Although a liquid whey concentrate that has been electrodialyzed can be used in the invention, it is preferable to convert the electrodialyzed liquid concentrate to the form of whey powder. This can be carried out by use of conventional spray drying equipment wherein the liquid concentrate is atomized in a chamber where the atomized particles are dispersed in a drying gas (see Pat. 2,088,606). Preferably, the drying operations are maintained such that the divided product from the drying chamber has a moisture content of the order of 12 to 18%. This moist discrete material is then subjected to secondary drying to produce the final product having a moisture content of the order of 4 to 6%. In some instances, for the convenience of the candy manufacturer, the whey may be provided in sweetened condensed form, in which event the sugar content is taken into account in formulating the confection mix.

In some instances it is desirable to retain the lactose content of the whey. In other instances it is desirable to remove some of the lactose, as for example by making use of the method disclosed in Pat. 3,447,930, wherein after electrodialyzing the material is further concentrated and some lactose removed in crystalline form. Such partially delactosed whey may have a lactose content of from 45 to 65% and a protein content of from 20 to 40%.

It will be evident that removal of a portion of the whey lactose effects an increase in the percentage of protein content and also an increase in the percentage of ash. With removal of from 25 to 90% or more of the mineral salt content, a normal whey containing all of its original lactose content (e.g., 75%) will have a residual ash content of about 6.5 to 0.9%. With reduction in lactose content to the 65% level, the percentage of ash for the same range of demineralization is effectively increased to about 12 to 1.5% and at the 45% level, to about 18 to 2.9%. However, for delactosed wheys it is desirable to have an ash content not in excess of about 12%. Therefore, for delactosed wheys having lactose contents of from 65 to 45%, the ash content after demineralization may range from about 12 to 1.5%, and for all wheys (i.e., normal and demineralized) from about 12 to 0.9%.

The electrodialyzed whey is employed together with the basic ingredients of the confection or candy to take the place of all or a substantial portion of other more expensive milk solids, such as skim milk solids.

The term sugar as used herein is intended to include all of the sugars commonly used in the confection industry. Such sugars are saccharides of vegetable origin and include sucrose, invert corn sugar, corn syrup, dextrose, unconverted dextrines, glucose, levulose and maltose and such sugars together with the lactose present and higher saccharides in the flours employed provide a substantial portion of the carbohydrate content of the final products. While lactose is a sugar, it is not of vegetable origin and it is not deemed to be a confection "sugar" as this term is used herein. Also higher saccharides in the flours are not deemed to be confection sugars.

In the manufacture of fudge type confections, care must be taken to avoid development of relatively large crystals such as cause objectionable graininess of the final product. Also the product should have an optimum texture, aside from good flavor and palatability. Assuming use of modern starch casting equipment, the fluidity of the mix at the time it is introduced into the starch molds is of importance. At the time the water content of the mix may be about 5 to 9%. We have noted that increased fluidity at this point in the confection making process greatly facilitates high speed mold filling operations with relatively accurate supplying of measured quantities of the mix to the molds.

With respect to the quality of the final fudge product, it is important for the product to have a long shelf-life without developing hardness. According to our observations hardening during storage is probably due to some continued sugar crystallization, and gradual loss of moisture. In an effort to minimize hardening during storage, it has been common to use varying quantities of a suitable humectant. Such ingredients add considerably to the cost of the confection, and may in some instances be considered undesirable. Many confection formulations making use of conventional milk solids, like skim milk, whole milk, or cream, have used substantial amounts of sorbitol or other humectant in an effort to promote shelf-like.

With the present invention, wherein electrodialyzed whey is used in place of all or a substantial part of conventional milk solids, we have found it possible to reduce or preferably entirely eliminate the use of sorbitol or other humectant. This is because the electrodialyzed whey imparts certain characteristics to the final product, such that it retains a desired texture and softness over long periods of storage at ambient room temperature without hardening.

We have found that when ordinary whey solids are used in confection mixes there is a masking of intended flavor. Thus, flavor intensity may be reduced, and/or a particular flavor altered or modified. In contrast, electrodialyzed whey does not have such flavor masking effect and therefore flavor components are not modified or impaired but are enabled to have maximum flavor effectiveness.

Our method for fudge manufacture makes use of mixing, cooking and handling techniques which are well known in the confection industry. However, our method differs in that electrodialyzed whey is employed in the mix, and the cooking temperatures used are substantially higher than in convention practice.

The flow sheet of the drawing illustrates a suitable procedure. The basic ingredients, including sugar and fat, water and electrodialyzed edible whey solids, are mixed in step 9 and then subjected to cooking in step 10. A suitable amount of water is also supplied, either by way of the water content of the ingredients or as a separate ingredient. The total water content of the mix may be about 12 to 18%.

The cooking step is carried out at temperature levels such that some water content is removed by evaporation, whereby at the end of the cooking step the mix has a proper moisture content (e.g., 5 to 9%) for further processing. Cooking is on an increasing temperature gradient as concentration increases. At this point the mix is subjected to cooling 11, after which in step 12 it is mixed with a small amount of fondant to speed crystallization of sugar. This mix, which in a typical instance may be at a temperature of the order of 180 to 210° F., is then subjected to processing operations to produce the desired final product. For example, to produce the product A, the mix from step 12 is supplied to the starch casting operation 13, which can be carried out by a conventional starch casting machine. After casting and before removal from the starch molds, the mix is subjected to cooling 14 to ambient room temperature, after which the solidified mix is separated from the starch in step 15, and packaged in step 16 to produce the final product A. Assuming that the product is to be used as a central fudge mass for a candy bar, the masses removed in step 15 can be subjected to a coating or enrobing operation 17, followed by cooling 18 to solidify the coating, and packaging 19 to produce product B.

To produce product C, the mix from step 12 is shown being subjected to extrusion 21, followed by cooling 22 to ambient room temperature, cutting 23 to pieces of suitable size, and packaging 24 to product the product C.

To produce product D, the mix from step 12 is shown being subjected to slab casting 26, cooling 27 to ambient room temperature, and cutting 28 to pieces of suitable size, after which the pieces are packaged at 29.

When electrodialyzed whey is substituted for the conventional milk solids in the manufacture of fudge type confections, we have found that it is desirable to heat the fudge mix to a substantially higher cook-out temperature. Thus a fudge mix having skim milks solids may normally be cooked for a period of about 30 minutes over a gradually increasing temperature gradient commencing at about 220° F. and ending at a cookout temperature of about 240 to 250° F. However, when electrodialyzed whey is substituted for the conventional milk solids, it is desirable to cook to a final cook-out temperature of the order of 250 to 265° F. This higher cook-out temperature is a characteristic of our method that is not completely understood. An unexpected benefit which has been found when electrodialyzed whey is substituted for conventional milk solids, together with a high cook-out temperature, is that the fluidity of the mix is substantially higher, both at the end of the cooking operation and after cooling in step 11 to a proper temperature for further treatment. This is desirable, particularly in that it facilitates subsequent operations such as illustrated in the flow sheet, including starch casting 13 in automtaic casting machines.

Normal cook-out temperatures for a confection mix of the caramel type having milk solids range from about 235 to 265° F. When electrodialyzed whey solids are substituted for milk solids, the cook-out temperature is of the order of 240 to 270° F.

The amount of electrodialyzed whey which is used in a fudge type confection formula may be comparable to the levels of conventional nonfat milk solids used in the past, or stated percentagewise, may vary from about 2.5 to 35% of the total mix, or from about 3.5 to 70% of the sugar content.

Use of electrodialyzed whey that has been partially delactosed makes possible confection mixes and products having a high protein level. For example, a given amount of electrodialyzed whey having a lactose content of about 75% may provide a whey protein level in a given confection mix of 4%. However, the same amount of partially delactosed electrodialyzed whey having a lactose content of 56%, in the same mix, can raise the whey protein level to about 10.5%.

Examples of the invention are as follows:

EXAMPLE 1

The ingredients employed for control and subject mixes were as follows:

|  | Percent | |
| --- | --- | --- |
| Formula | Control | Subject formula |
| Sucrose | 30.5 | 30.5 |
| Corn syrup (42 DE) | 21.4 | 21.4 |
| Sweetened condensed skim milk (26% solids) | 55.0 | |
| Reconstituted sweetened electrodialyzed cheddar cheese whey having 25% of its mineral salts removed | | 11.0 |
| Vegetable oil (76° F. Wiley) | 7.3 | 7.3 |
| Invert sugar | 4.5 | 4.5 |
| Salt | 0.34 | 0.34 |
| Lecithin | 0.12 | 0.12 |
| Water | 9.14 | 9.14 |
| Fondant | 11.7 | 11.7 |
| Frappe | 4.0 | 4.0 |
| Total | 100.00 | 100.00 |

The ingredients for the fondant were as follows:

|  | Percent |
| --- | --- |
| Sucrose | 66.6 |
| Corn syrup | 16.7 |
| Water | 16.7 |
|  | 100.00 |

The above fondant ingredients were combined and cooked to 242° F. The resulting syrup was then cooled to 100° F. in a fondant mixer and the batch beaten to the required consistency.

The frappe was made with the following ingredients:

|  | Percent |
| --- | --- |
| Egg albumen (powdered) | 2.2 |
| Water | 3.9 |
| Sucrose | 38.5 |
| Corn syrup | 51.3 |
| Water | 4.1 |
|  | 100.0 |

The above ingredients were processed as follows: the albumen was dissolved in water by soaking for two hours. The sucrose, corn syrup and water were heated together to 220° F. to dissolve the sucrose. The resulting syrup was cooled to 160° F. or below in a mixing bowl while beating and the albumen solution was then added and the batch beaten for 14 minutes.

The reconstituted electrodialyzed whey was prepared as follows:

|  | Percent |
| --- | --- |
| Electrodialyzed cheddar cheese whey having 25% of its mineral salt content removed by electrodialysis | 30.0 |
| Sucrose | 42.0 |
| Water | 28.0 |
|  | 100.0 |

The whey powder was mixed in the water until adequately dispersed. The sucrose was then mixed in until dissolved. The procedure to prepare the confection from the above ingredients was substantially as described above in connection with the drawing, with the cooled mix from step 12 being supplied to the slab casting operation 26 to produce product D. More specifically, for the control batch all of the ingredients, except the fondant and frappe, were combined and cooked slowly with constant stirring to 250° F. For the subject batch the cooking temperature was to 260° F. Both batches were then set aside and permitted to cool in a pan to 200° F. The fondant and frappe were then added to each batch and thoroughly mixed in. Each batch was then cast on silicone paper supported on a cooling surface and permitted to stand for 24 hours. The batches were then cut and stored for quality and shelf-life studies.

It was found that the subject batch made by use of electrodialyzed whey was a fudge which possessed a number of advantageous properties that distinguished it from the control batch. The subject batch product had a desirable texture. It had a superior softness that was maintained over a storage period of about 180 days. In contrast, the control batch product when stored for the same period under like conditions hardened to an objectionable degree, thus demonstrating that its hardening rate was definitely more rapid than that of the batch produced by use of electrodialyzed whey.

In addition to the characteristics referred to above, it was noted that the fluidity of the mix at the end of the mixing step 12 was substantially greater for the subject batch compared with the control.

EXAMPLE 2

The following example illustrates the invention being compared with a fudge formula making use of sorbitol as a humectant.

|  | Percent | |
| --- | --- | --- |
|  | Control batch with sorbitol | Subject batch |
| Water | 8.78 | 9.14 |
| Sucrose | 29.2 | 3.5 |
| Lecithin | 0.12 | 0.16 |
| Corn syrup | 20.6 | 21.4 |
| Vegetable oil (76° F. Wiley) | 7.0 | 7.3 |
| Invert sugar | 4.32 | 4.5 |
| Salt | 0.33 | 0.34 |
| Sorbitol | 4.0 | |
| Sweetened condensed skim milk (72% solids) | 10.6 | |
| Reconstituted sweetened whey (25% mineral salts removed) (72% solids) | | 11.0 |
| Fondant | 11.2 | 11.7 |
| Frappe | 3.85 | 4.0 |
| Total | 100.00 | 100.00 |

The above batches were processed in the same manner as described in connection with Example 1. The batch containing sorbitol and skim milk solids was coocked to a temperature of about 250° F. The subject formula containing electrodialyzed whey solids in place of skim milk solids was cooked to a substantially higher temperatrue of the order of about 260° F. In the cooling operation 11 both batches were cooled to the same level of about 200° F. At that time it was noted that the subject batch had greater fluidity than the batch conaining sorbitol and skim milk solids. This fluidity was retained after the mixing step 13, at which time the fondant and frappe were introduced.

With respect to the final products obtained by Example 2, it was noted that the subject batch produced a fudge type product having a flavor similar to the control batch. The subject batch had a superior texture and a somewhat softer consistency than the control batch. When stored at ambient room temperature for periods of 180 days to obtain a comparison with respect to shelf-life, it was noted that the subject product retained its texture and softness without appreciable hardening. In this respect it was the full equivalent of the control product obtained with the use of sorbitol. This demonstrates that our invention makes it possible to eliminate the use of sorbitol or like humectant.

The foregoing examples pertain to the manufacture of candies or confections of the fudge type, which are characterized by the presence of some crystallized sugar. We have found that electrodialyzed whey can also be used to advantage in the manufacture of candies or confections of the caramel type, which are characterized by the absence of crystallized sugar. Particularly we have found that the use of electrodialyzed whey in place of nonfat milk solids affects a noticeable improvement in flavor which is attributed in part to the absence of flavor masking.

Examples of caramel type confections made with electrodialyzed whey are as follows:

EXAMPLE 3

The formula employed was as follows:

| | Lbs. |
|---|---|
| Electrodialyzed whey solids (50% of mineral salts removed) | 30.80 |
| Sucrose | 29.80 |
| Corn syrup solids (42E) | 13.80 |
| Vegetable fat (emulsified coconut fat) | 1.06 |
| Water | 24.45 |
| | 99.91 |

Vanilla—.042% (2 grams 2X)

The above ingredients were cooked to a boiling point at 250° F. It was then poured onto a sheet or slab, cooled to room ambient temperature, and cut into pieces.

The product was of excellent quality and was considered desirable and suitable for coating.

Example 4

The following is an example of the manufacture of caramels using partially delactosed electrodialyzed whey.

A control batch was made using a formula for a typical stand-up slab-cooled caramel appearing in "A Text Book on Candy Making" by A. E. Leighton but modified by substituting vegetable fat and non-fat milk solids for dairy cream. Thus the formula for the control batch was as follows:

| | Lbs. |
|---|---|
| Sugar (Bakers special) | 33.9 |
| Corn syrup (42DE) | 24.9 |
| Fat (hydrogenated emulsified coconut fat) | 10.3 |
| Milk solids (nonfat, spray dried) | 2.9 |
| Water | 28.0 |

To facilitate dispersement of the non-fat milk solids in the mix, the fat was first melted in a steam-heated kettle at 145–150° F. and the dry milk solids dispersed therein. The corn syrup, sugar and water were then added and mixed in to form a homogeneous material of syrup-like consistency. This mix was then cooked over an increasing temperature gradient to a cook-out temperature of 249° F. It was then poured on a slab to cool.

The product made with the control batch as described above had a mild, light butterscotch flavor. The texture was such that it was moderately hard and chewy.

A subject batch was made in accordance with the following formula:

| | Lbs. |
|---|---|
| Sugar (Bakers special) | 33.9 |
| Corn syrup (42DE) | 24.9 |
| Fat (hydrogenated emulsified coconut fat) | 10.3 |
| Electrodialyzed delactosed whey solids (lactose content 56%–25% mineral salts removed) | 2.9 |
| Water | 28.0 |

The procedure employed was the same as with the control batch. The final product produced was somewhat more caramel-like and tested richer than the control product. It was slightly darker in color but with essentially the same texture.

EXAMPLE 5

A topping was prepared using the general formula of Example 3. At the end of the cooking operation the mixture was permitted to cool with agitation to slightly below 212° F. Then 10 cc. of vanilla concentrate and 50 cc. of water at about 212° F. were added. After blending, the mixture was poured off and permitted to cool to room ambient temperature.

The confection topping produced by this Example 5 had a rich creamy pleasing flavor, together with a heavy but pourable texture. Its color was somewhat darker than the subject caramel product produced by Example 3, and it had a richer caramel-like color. It was quite suitable for use as a dessert topping.

EXAMPLE 6

The following is another example showing application of the invention to making a caramel type food confection. The ingredients employed were as follows:

| Ingredient: | Level percent |
|---|---|
| Sucrose | 28.8 |
| Corn syrup (42DE) | 22.0 |
| High protein electrodialyzed and partially delactosed whey (lactose content 56% and 85% mineral salts removed) | 24.0 |
| Vegetable oil (Type 1) (92° F.) (emulsified hydrogenated coconut fat) | 9.0 |
| Salt | 0.35 |
| Flavor | 0.30 |
| Water | 15.55 |

The high protein demineralized whey was gradually mixed in the water. The sucrose, corn syrup, vegetable oil and salt were combined and then blended with the whey. The batch was then cooked to a cook-out temperature of 242° F. and cast on a cooling surface in the same way as a stand-up caramel.

The confection produced by Example 6 had a protein content of about 10%, with a caramel-like consistency.

The high protein demineralized and partially delactosed whey used in Example 6 analyzed as follows:

| | | |
|---|---|---|
| Total protein | percent | 33.69 |
| Moisture | do | 3.20 |
| Fat | do | 2.77 |
| Lactose | do | 56.0 |
| Ash | do | 2.23 |
| Na | mg./kg | 24.91 |
| Ca | percent | 0.62 |
| Mg | do | 0.12 |
| (P) $PO_4$ | do | 0.11 |
| Chlorides | do | 0.03 |
| Citrate | do | 0.24 |
| Solubility index | | Trace |
| pH | | 6.10 |

In general this whey was of the low heat type in that there was no substantial amount of denaturation of the protein content. Such a whey can be produced by removing a substantial amount of the original lactose content together with electrodialysis for the removal of a substantial amount of the mineral salts.

We claim:

1. A confection mix comprising sugar, fat and partially delactosed electrodialyzed whey solids having an ash content of about 12 to 1.5% and a lactose content ranging from about 45 to 65%, the amount of whey solids being about 3.5 to 70% of the sugar content, the confection being characterized by a substantial absence of a humectant and of the solids of a dairy milk other than the solids of whey.

2. A confection or candy containing sugar, fat, water and electrodialyzed whey solids having an ash content of about 6.5 to 0.9%, the whey constituting about 2.5 to 35% of the total weight of the candy and about 3.5 to 70% of the sugar content, the confection being characterized by a substantial absence of a humectant and of the solids of a dairy milk other than the solids of whey.

3. A method for the manufacture of a confection or candy of the fudge type, comprising cooking a mixture of ingredients including sugar, fat, electrodialyzed whey and water to a cook-out temperature of about 250 to 265° F., the electrodialyzed whey having an ash content of about 6.5 to 0.9% and the amount of whey being about 3.5 to 70% of the sugar content of the mix, cooling the mix to a temperature of about 180 to 210° F., adding a minor percentage of crystallized sugar to the mix to cause crystallization of sugar, forming the resulting mix into masses of desired form and then permitting the mix to solidify.

4. A method for the manufacture of a confection or a candy of the fudge type, comprising cooking a mixture of ingredients including sugar, fat, electrodialyzed and partially delactosed whey and water to a cook-out temperature of about 250 to 265° F., the electrodialyzed and partially delactosed whey having an ash content of about 12 to 1.5% and a lactose content of about 45 to 65% and the amount of whey being about 3.5 to 70% of the sugar content of the mix, cooling the mix to a temperature of about 180 to 210° F., adding a minor percentage of crystallized sugar to the mix to cause crystallization of sugar, forming the resulting mix into masses of desired form, and then permitting the mix to solidify.

5. A method for the manufacture of a confection or a candy of the caramel type, comprising cooking a mixture of ingredients including sugar, fat, electrodialyzed whey and water to a cook-out temperature of about 240–270° F., the electrodialyzed whey having an ash content of about 6.5 to 0.9% and the amount of whey being about 3.5 to 70% of the sugar content of the mix, forming the resulting mix into masses of desired form and then permitting the mix to solidify.

6. A method for the manufacture of a confection or a candy of the caramel type, comprising cooking a mixture of ingredients including sugar, fat, electrodialyzed and partially delactosed whey and water to a cook-out temperature of about 240 to 270° F., the electrodialyzed partially delactosed whey having an ash content of about 12 to 1.5% and a lactose content ranging from about 45 to 65% and the amount of whey being about 3.5 to about 70% of the sugar content of the mix, forming the resulting mix into masses of desired form and then permitting the mix to solidify.

References Cited
UNITED STATES PATENTS 3,447,930   6/1969   Francis _____ 99—57

OTHER REFERENCES

Progress in Candy Research, USDA-SRRL Report, Confectioner's Journal 77 (917); June 1951, pp. 14, 18 and 20.

Alesch, Utilization of Whey Solids in Food Products, Journ. of Dairy Sci., vol. 41:5, May 1958, pp. 699–700.

ALVIN E. TANENHOLTZ, Primary Examiner

J. M. HUNTER, Assistant Examiner

U.S. Cl. X.R.

99—57